United States Patent
Nadimpalli

(10) Patent No.: US 8,461,910 B2
(45) Date of Patent: Jun. 11, 2013

(54) HIGH EFFICIENCY NEGATIVE REGULATED CHARGE-PUMP

(75) Inventor: Praveen Varma Nadimpalli, Chandler, AZ (US)

(73) Assignee: RF Micro Devices, Inc., Greensboro, NC (US)

( * ) Notice: Subject to any disclaimer, the term of this patent is extended or adjusted under 35 U.S.C. 154(b) by 89 days.

(21) Appl. No.: 13/105,012

(22) Filed: May 11, 2011

(65) Prior Publication Data

US 2012/0218032 A1 Aug. 30, 2012

Related U.S. Application Data

(60) Provisional application No. 61/446,171, filed on Feb. 24, 2011.

(51) Int. Cl.
*G05F 1/575* (2006.01)
(52) U.S. Cl.
USPC ............................................. 327/536; 363/60
(58) Field of Classification Search
None
See application file for complete search history.

(56) References Cited

U.S. PATENT DOCUMENTS

| | | | |
|---|---|---|---|
| 5,680,300 A | 10/1997 | Szepesi et al. | |
| 6,130,572 A | 10/2000 | Ghilardelli et al. | |
| 6,300,820 B1 | 10/2001 | Fotouhi et al. | |
| 6,400,211 B1 * | 6/2002 | Yokomizo et al. | 327/536 |
| 6,452,438 B1 | 9/2002 | Li | |
| 6,522,558 B2 | 2/2003 | Henry | |
| 7,535,281 B2 * | 5/2009 | Olsen | 327/536 |
| 7,990,741 B2 * | 8/2011 | Martinussen | 363/60 |
| 2008/0122941 A1 * | 5/2008 | Kikuchi et al. | 348/222.1 |

* cited by examiner

*Primary Examiner* — Lincoln Donovan
*Assistant Examiner* — Terry L Englund
(74) *Attorney, Agent, or Firm* — Withrow & Terranova, P.L.L.C.

(57) ABSTRACT

A charge-pump circuit includes at least one flying capacitor stage having a capacitor with a first terminal selectively coupled between a negative voltage input through a first electronic switch and a negative voltage output through a second electronic switch. A second terminal of the capacitor is selectively coupled between a fixed voltage node through a third electronic switch and an error signal input through a fourth electronic switch. A positive voltage source is coupled to the negative voltage output through a feedback network. A feedback amplifier having an error signal output, a reference voltage input, and a feedback input is coupled to the feedback network. A switch controller having a first clock output drives the first electronic switch and the third electronic switch, while a second clock output drives the second electronic switch and the fourth electronic switch.

20 Claims, 10 Drawing Sheets

HIGH EFFICIENCY NEGATIVE REGULATED CHARGE-PUMP

RELATED APPLICATION

This application claims the benefit of provisional patent application Ser. No. 61/446,171, filed Feb. 24, 2011, the disclosure of which is hereby incorporated herein by reference in its entirety.

FIELD OF THE DISCLOSURE

The present disclosure relates to charge-pumps that provide regulated negative voltages.

BACKGROUND

Traditionally, negative voltage charge-pumps are used to control radio frequency (RF) switches that are implemented using a pseudomorphic high electron mobility transistor/complementary metal oxide semiconductor (pHEMT/CMOS) process. Negative voltage generated by a negative voltage charge-pump is usable to turn off pHEMT/CMOS based RF switches. Using a negative voltage instead of a positive voltage improves the isolation of a pHEMT/CMOS based RF switch and eliminates the need for DC blocking capacitors for proper operation of pHEMT/CMOS based RF switches. The lack of blocking capacitors reduces the area needed to implement a pHEMT/CMOS based RF switch, which simplifies the design of electrostatic discharge (ESD) protection.

RF switches driven by a negative charge-pump typically have leakage currents that are supplied through a negative voltage output of the negative charge-pump. If an unregulated negative charge-pump is used to supply the leakage currents, an output voltage provided at the negative voltage output drops as the leakage currents increase. As a result, insertion losses and isolation numbers for the RF switches are adversely affected. In contrast, a regulated negative charge-pump will maintain a fixed output voltage as the leakage currents increase. It has been recognized that improved efficiencies can be realized by sourcing load currents in a feedback loop of the regulated negative charge-pump directly from a main power supply. For example, twice as much current will be drained from the main power supply if a load current is sourced from a voltage doubled section of the feedback loop. Such a large drain of current from the main power supply is inefficient and undesirable.

A regulated negative charge-pump will operate most efficiently when voltage regulation of the output voltage of the regulated negative charge-pump is maintained near to the regulated negative charge-pump's ideal output voltage. For example, an ideal output voltage for a regulated negative charge-pump that doubles a source voltage is twice the voltage of the source voltage. In general, a regulated negative charge-pump that is designed to boost a source voltage $V_{dd}$ by a multiplication factor N will operate most efficiently when a negative output voltage $V_{OUT}$ is maintained at N times the source voltage $V_{dd}$. Efficiency for a charge-pump is given by the following equation:

$$\text{Efficiency} = V_{OUT}/(N*V_{dd})$$

However, achieving a maximum efficiency depends on a given design specification and in some cases it might not be possible to regulate the negative output voltage $V_{OUT}$ close to an ideal voltage because the ideal voltage might be in the breakdown region of a CMOS switch being driven by the negative output voltage $V_{OUT}$.

One way to implement a regulated negative charge-pump is through the use of a shunt regulator at the output of an unregulated negative charge-pump. FIG. 1 depicts a related art shunt regulated negative charge-pump 10 having a flying capacitor stage 12 with a capacitor $C_{FLY}$ having a first terminal that is selectively coupled between a first negative voltage source 14 through a first electronic switch S1 and a negative voltage output 16 through a second electronic switch S2. The capacitor $C_{FLY}$ also has a second terminal that is coupled to a fixed voltage node such as ground GND. The first electronic switch S1 is driven by a clock signal CLK, and the second electronic switch S2 is driven by a clock signal $\overline{CLK}$. The clock signals CLK and $\overline{CLK}$ are non-overlapping and out of phase relative to each other. A positive regulated voltage source 18 is communicatively coupled to the negative voltage output 16 through a feedback network 20 made up of a first resistor R1 and a second resistor R2 coupled in a voltage divider configuration. An error amplifier 22 has an inverting input 24 coupled to a voltage divider node 26 between the first resistor R1 and the second resistor R2. The error amplifier 22 further includes a non-inverting input 28 that is coupled to a negative voltage reference $-V_{REF}$.

The error amplifier 22 is powered by a second negative voltage source 32 that provides a negative supply voltage that is above the negative output voltage $V_{OUT}$, and a third negative voltage source 34 that provides a negative voltage that is below the negative output voltage $V_{OUT}$. A voltage of $-3V_{dd}$ for the first negative voltage source 14 and the third negative voltage source 34 is generated by a negative voltage quadrupler (not shown). A voltage of $-2V_{dd}$ for the second negative voltage source 32 is generated by a negative voltage tripler (not shown). The negative voltage tripler is able to triple the source voltage $V_{dd}$ because a voltage equal to $-V_{dd}$ is generated by a voltage doubler circuit (not shown) that is sourced from $V_{dd}$. Alternately, a cascading of two voltage doubler circuits can be adapted to provide a voltage tripler circuit.

The shunt regulated negative charge-pump 10 also includes an n-channel enhancement mode FET M1 that has a gate coupled to an error signal output 30 of the error amplifier 22. The FET M1 also has a source coupled to the third negative voltage source 34, and a drain coupled to the negative voltage output 16. A load capacitor $C_{LOAD}$ has a first terminal coupled to the negative voltage output 16, and a second terminal coupled to a fixed voltage node such as ground GND.

When the switch S1 is closed and the switch S2 is open, the flying capacitor $C_{FLY}$ is charged to $-3V_{dd}$. When the switch S2 is closed and the switch S1 is open, the FET M1 turns on and pulls charge away from the capacitor $C_{FLY}$ and the capacitor $C_{LOAD}$ until a voltage at the voltage divider node 26 is equal to the reference voltage $-V_{REF}$. The load current $I_{LOAD}$ comes from the second negative voltage source 32, which in this case supplies a voltage of $-2V_{dd}$. As a result of the second negative voltage source 32 supplying the load current $I_{LOAD}$ at a voltage of $-2V_{dd}$, the source of the voltage $V_{dd}$ must supply three times as much current as the load current $I_{LOAD}$. Thus, the efficiency of the shunt regulated negative charge-pump 10 is less than the efficiency desired for battery powered equipment such as mobile terminals.

Another way to implement a regulated negative charge-pump is to use a series regulator at the output of an unregulated negative charge-pump. FIG. 2 depicts a related art series regulated negative charge-pump 36 that is similar to the shunt regulated negative charge-pump 10 (FIG. 1). However, in this particular case, the FET M1 is a p-channel enhancement mode type device that has a drain coupled directly to the second negative voltage source 32. In contrast to the shunt regulated charge-pump 10, the FET M1 has a source coupled to the negative voltage output 16. The source of the FET M1 is also coupled to the third negative voltage source 34 through a third resistor R3. However, even with these structural changes that implement series regulation in place of shunt regulation, the problem of inefficient operation remains. In effect, the load current $I_{LOAD}$ is still supplied by the second negative voltage source 32, which in this case supplies a voltage of $-2V_{dd}$. As a result of the second negative voltage source 32 supplying the load current $I_{LOAD}$ at a voltage of $-2V_{dd}$, the source of the voltage $V_{dd}$ must supply three times as much current as the load current $I_{LOAD}$. Thus, the series regulated negative charge-pump 36 also provides less than the efficiency desired for battery powered equipment such as mobile terminals. Therefore, a need remains for a high efficiency regulated negative charge-pump.

SUMMARY

The present disclosure provides a high efficiency negative regulated charge-pump, which in certain embodiments is implemented via a Silicon-on-insulator (SOI) process or a Deep negative-well (N-Well) complementary metal oxide semiconductor (CMOS) process. In particular, the present disclosure provides a circuit that includes at least one flying capacitor stage with a capacitor having a first terminal that is selectively coupled to either a negative voltage input through a first electronic switch or a negative voltage output through a second electronic switch. The capacitor also has a second terminal that is selectively coupled between a fixed voltage node through a third electronic switch and an error signal input through a fourth electronic switch. The circuit also has a positive voltage source that is communicably coupled to the negative voltage output through a feedback network having a feedback output. Also included in the circuit is a feedback amplifier having an error signal output, a reference voltage input, and a feedback input coupled to the feedback output of the feedback network. The error signal output of the feedback amplifier is coupled to the error signal input. Moreover, a switch controller has a first clock output for driving the first electronic switch and the third electronic switch, and a second clock output for driving the second electronic switch and the fourth electronic switch.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 3:
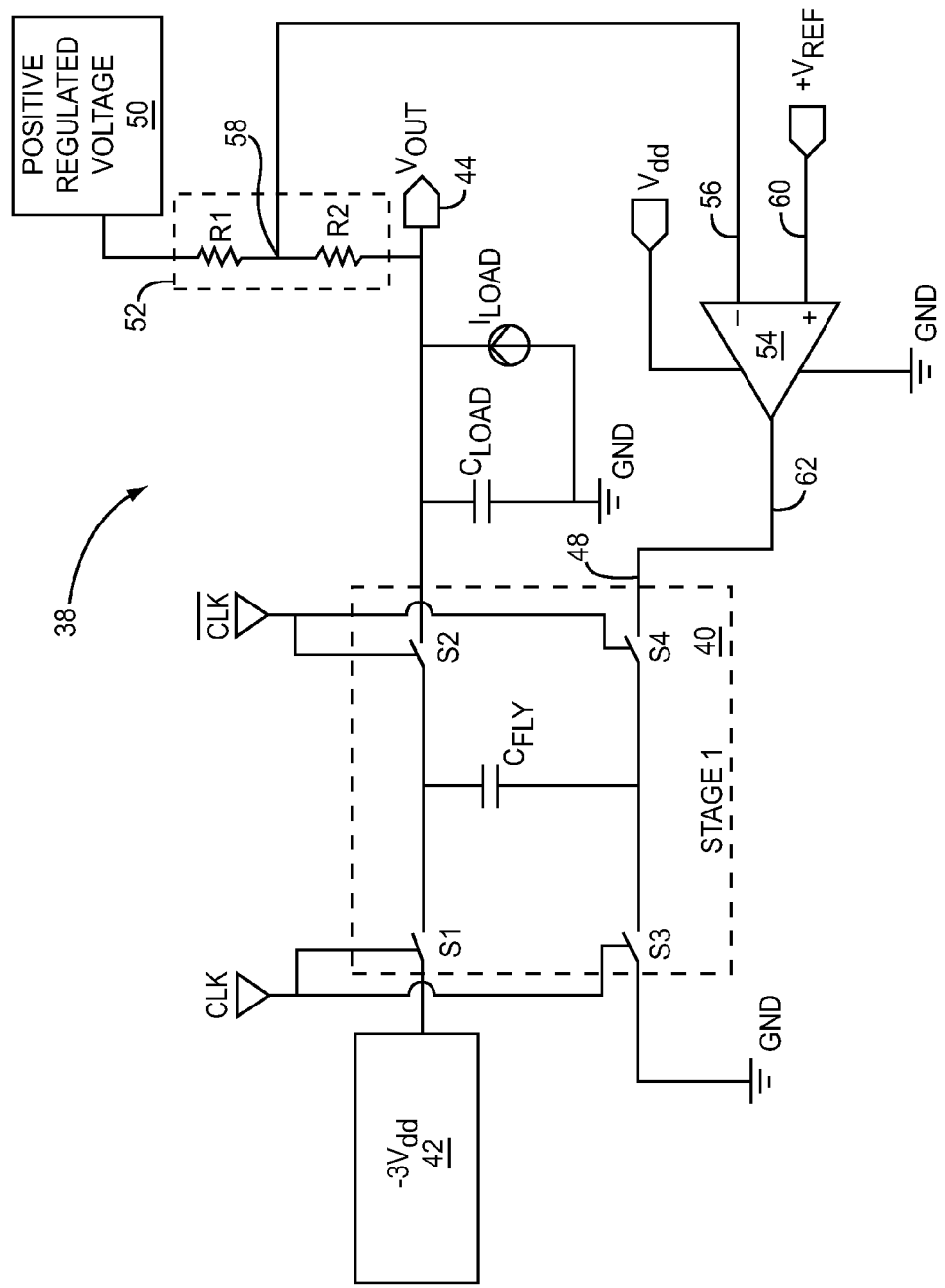
FIG. 3 depicts a high efficiency regulated negative charge-pump that is in accordance with the present disclosure.

FIG. 3 depicts a high efficiency regulated negative charge-pump 38 that is in accordance with the present disclosure. The high efficiency regulated negative charge-pump 38 includes a flying capacitor stage 40 with a capacitor $C_{FLY}$ having a first terminal that is selectively coupled to either a negative voltage source 42 through a first electronic switch S1 or a negative voltage output 44 through a second electronic switch S2. The capacitor $C_{FLY}$ also has a second terminal that is selectively coupled to a fixed voltage node such as ground GND through a third electronic switch S3. The second terminal of the capacitor $C_{FLY}$ is also selectively coupled through a fourth electronic switch S4 to an error signal input 48. A positive voltage source 50 is communicably coupled to the negative voltage output 44 through a feedback network 52 made up of a first resistor R1 and a second resistor R2 coupled in a voltage divider configuration. A feedback amplifier 54 has an inverting input 56 coupled to a feedback output at a voltage divider node 58 between the first resistor R1 and the second resistor R2. The feedback amplifier 54 also includes a non-inverting input 60 that is coupled to a positive voltage reference $+V_{REF}$.

Figure 1:
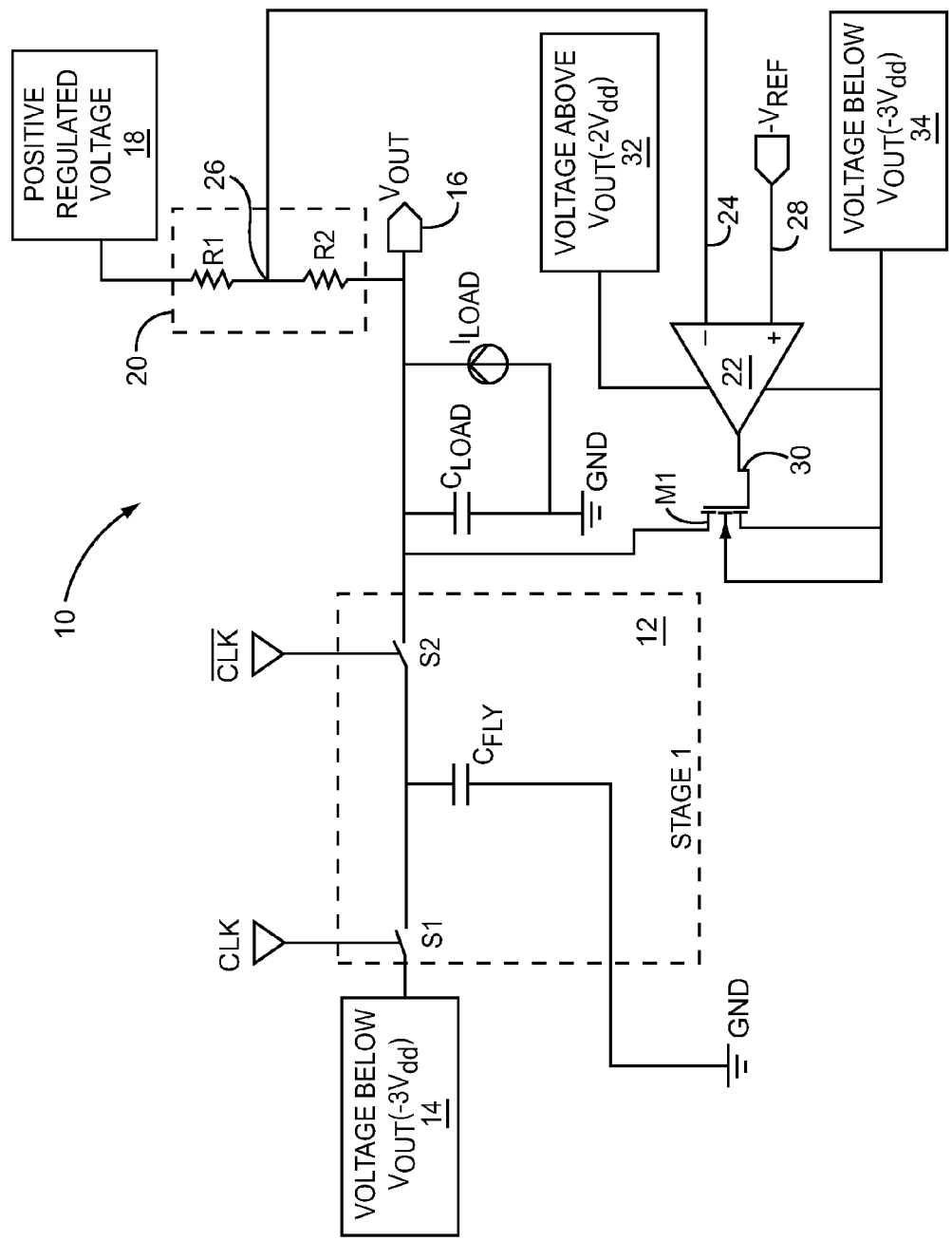
FIG. 1 depicts a related art shunt regulated negative charge-pump.
Figure 2:
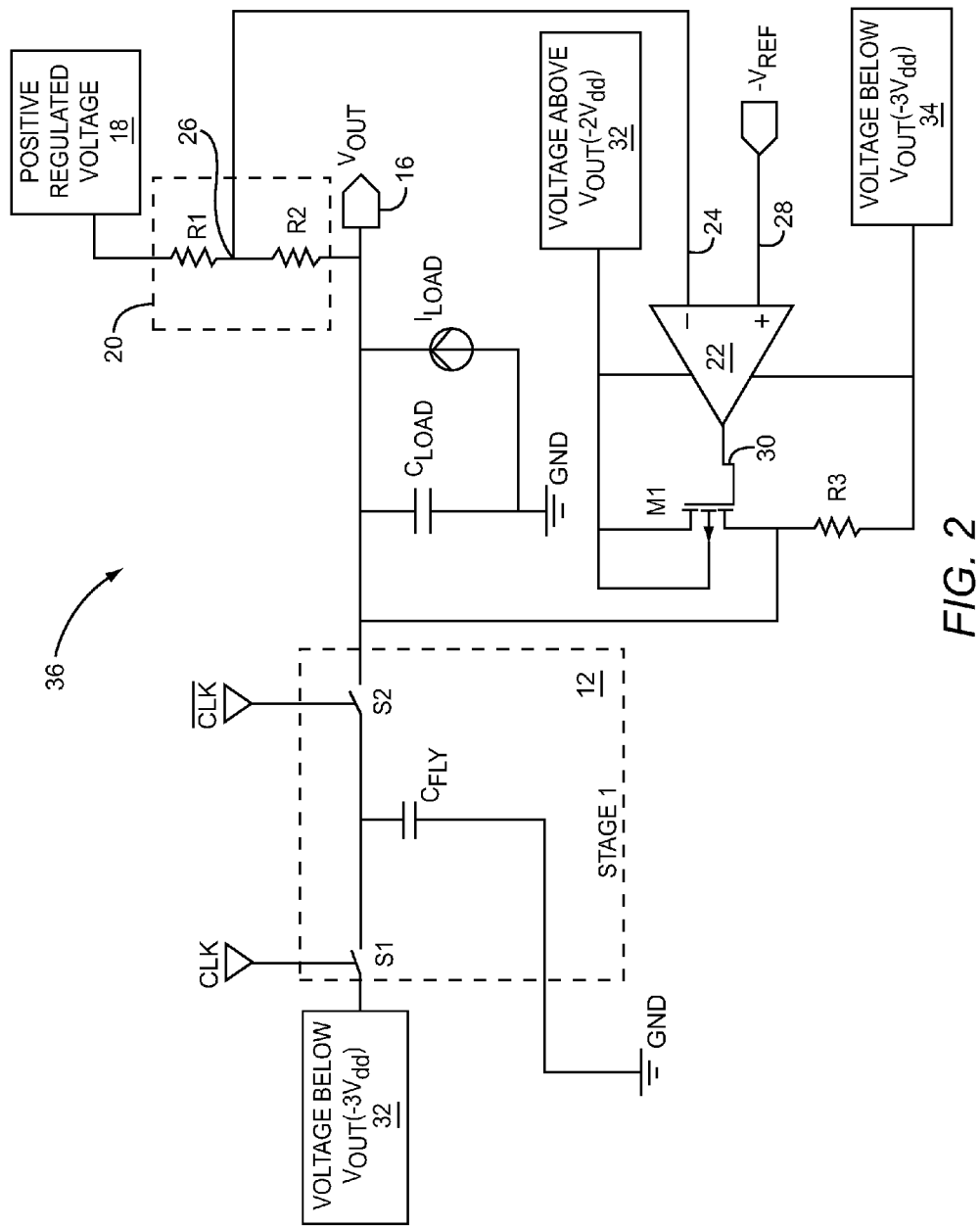
FIG. 2 depicts a related art series regulated negative charge-pump.

The feedback amplifier 54 further includes an output 62 that is coupled to the error signal input 48. Unlike the regulated negative charge-pump 10 (FIG. 1) and the regulated negative charge-pump 36 (FIG. 2), the feedback amplifier 54 may be powered directly from $V_{dd}$ and a fixed voltage node, which in this case is ground GND. Therefore, a load current $I_{LOAD}$ is directly supplied from $V_{dd}$. As a result of $I_{LOAD}$ being directly supplied by $V_{dd}$, the high efficiency regulated negative charge-pump 38 is at least three times as efficient as either the regulated negative charge-pump 10 or the regulated negative charge-pump 36.

In operation, the electronic switches S1 and S3 are closed in response to a first state of the first clock signal CLK, while the switches S2 and S4 are opened in response to a first state of the second clock signal $\overline{CLK}$. While the electronic switches S1 and S3 are closed, the capacitor $C_{FLY}$ is charged to a voltage level of $-3V_{dd}$. Once the capacitor $C_{FLY}$ is charged, the electronic switches S1 and S3 are opened in response to a second state of the first clock signal CLK. After a short delay that prevents an overlap of the first clock signal CLK and the second clock signal $\overline{CLK}$, the electronic switches S2 and S4 are closed in response to a second state of the second clock signal $\overline{CLK}$. At this point, the output 62 of the feedback amplifier 54 provides an output voltage level that adds or subtracts from the voltage of the charged capacitor $C_{FLY}$ depending upon a comparison of the reference voltage $+V_{REF}$ and the feedback output at a voltage level present at the voltage divider node 58. For example, if the voltage level present at the voltage divider node 58 is greater than the reference voltage $+V_{REF}$, the output 62 will pull charges from the capacitor $C_{FLY}$ and the capacitor $C_{LOAD}$. Alternately, if the voltage level present at the voltage divider node 58 is less than the reference voltage $+V_{REF}$, the output 62 will add charge to the capacitor $C_{FLY}$ and the capacitor $C_{LOAD}$. In this way, a negative voltage level $I_{OUT}$ provided at the negative voltage output 44 is regulated.

Figure 4:
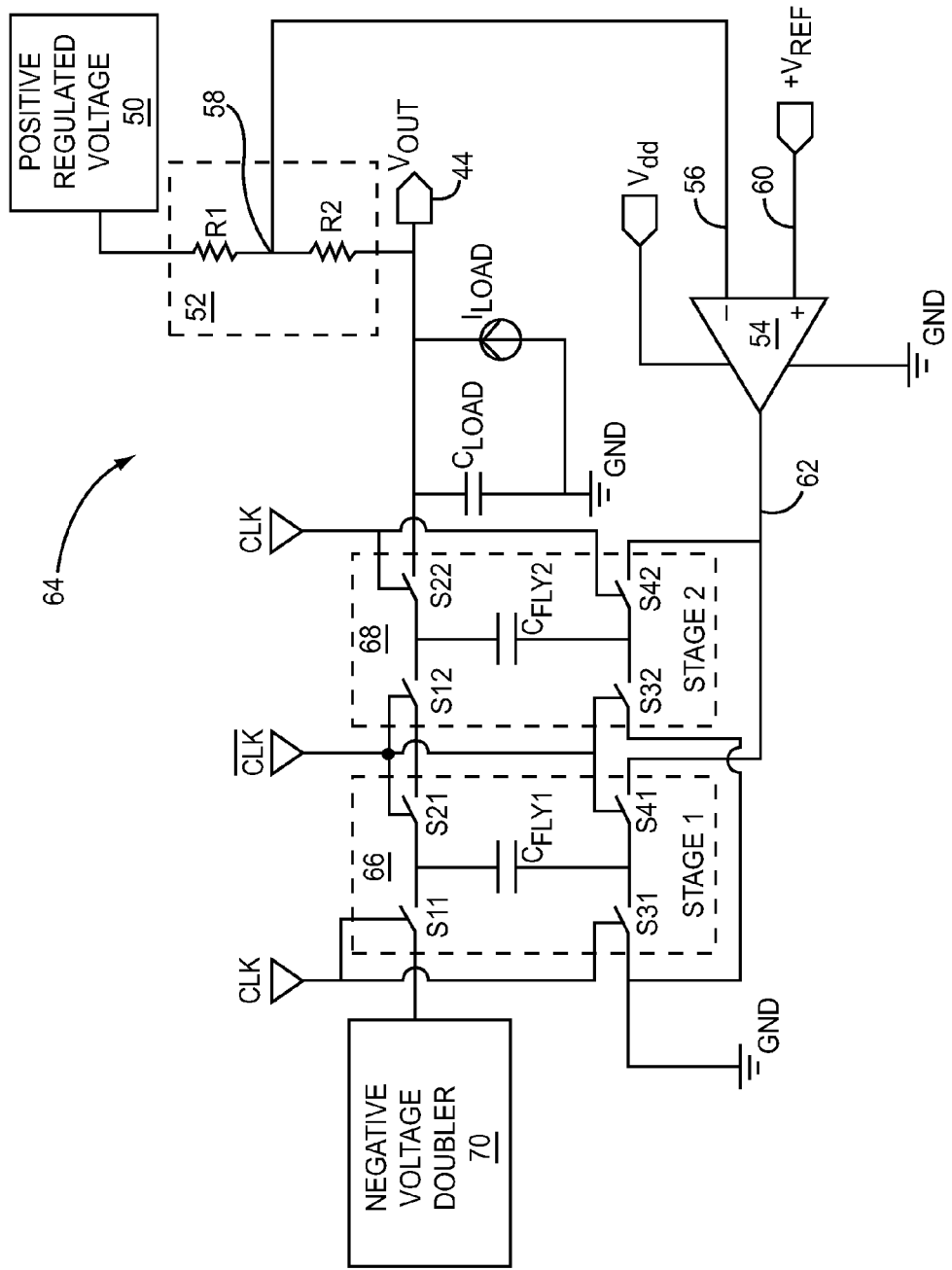
FIG. 4 depicts a regulated negative charge-pump that is driven by a negative voltage doubler having two stages in accordance with the present disclosure.

FIG. 4 depicts another regulated negative charge-pump 64 that is in accordance with the present disclosure. The regulated negative charge-pump 64 has a first stage 66 and a second stage 68 that are driven by a negative voltage doubler circuit 70. The first stage 66 includes a flying capacitor $C_{FLY1}$ having a first terminal coupled to a first electronic switch S11 and a second electronic switch S21. The flying capacitor $C_{FLY1}$ also has a second terminal coupled to a third electronic switch S31 and a fourth electronic switch S41. The second stage 68 includes a flying capacitor $C_{FLY2}$ having a first terminal coupled to a first electronic switch S12 and a second electronic switch S22. The flying capacitor $C_{FLY2}$ also has a second terminal coupled to a third electronic switch S32 and a fourth electronic switch S42.

The first terminal of the flying capacitor $C_{FLY1}$ is selectively coupled to the negative voltage doubler 70 via the first electronic switch S11, while the second terminal of the flying capacitor $C_{FLY2}$ is selectively coupled to a fixed voltage node such as ground GND. The first terminal of the flying capacitor $C_{FLY1}$ is also selectively coupled to the first terminal of the flying capacitor $C_{FLY2}$ via the second electronic switch S21 of the first stage 66 and the first electronic switch S12 of the second stage 68, wherein the first electronic switch S12 and the second electronic switch S21 are both driven by the second clock signal $\overline{CLK}$. The first terminal of the flying capacitor $C_{FLY2}$ is also selectively coupled to the negative voltage output 44 through the second electronic switch S22. The second terminal of the flying capacitor $C_{FLY2}$ is selectively coupled to the second terminal of the flying capacitor $C_{FLY1}$ via the third electronic switch S32 and the fourth electronic switch S41. The second terminal of the flying capacitor $C_{FLY2}$ is selectively coupled to the output 62 of the feedback amplifier 54 through the fourth electronic switch S42.

In operation, the electronic switches S11 and S31 are closed in response to a first state of the first clock signal CLK, while the electronic switches S21, S41, S12, and S32 are opened in response to a first state of the second clock signal $\overline{CLK}$. While the electronic switches S11 and S31 are closed, the capacitor $C_{FLY1}$ is charged to a voltage level of around $-3V_{dd}$. Once the capacitor $C_{FLY1}$ is charged, the electronic switches S11 and S31 are opened in response to a second state of the first clock signal CLK. After a short delay that prevents an overlap of the first clock signal CLK and the second clock signal $\overline{CLK}$, the electronic switches S21, S41, S12 and S32 are closed in response to a second state of the second clock signal $\overline{CLK}$.

At this point, the output 62 of the feedback amplifier 54 provides an output voltage level that adds or subtracts from the voltage of the capacitors $C_{FLY1}$ and $C_{FLY2}$ depending upon a comparison of the reference voltage $+V_{REF}$ and the feedback output at a voltage level present at the voltage divider node 58. For example, if the voltage level present at the voltage divider node 58 is greater than the reference voltage $+V_{REF}$, the output 62 will pull charge from the capacitors $C_{FLY1}$ and $C_{FLY2}$. Alternately, if the voltage level present at the voltage divider node 58 is less than the reference voltage $+V_{REF}$, the output 62 will add charge to the capacitors $C_{FLY1}$ and $C_{FLY2}$.

Next, the first clock signal CLK and the second clock signal $\overline{CLK}$ both change state so that the electronic switches S21, S41, S12 and S32 are opened, while the electronic switches S11, S31, S22 and S42 are closed. As such, the charge is transferred from the capacitor $C_{FLY2}$ to the capacitor $C_{LOAD}$, while the feedback amplifier 54 provides an output voltage level that adds or subtracts from the voltage of the capacitors $C_{FLY1}$ and $C_{FLY2}$ depending upon a comparison of the reference voltage $+V_{REF}$ and the feedback output at a voltage level present at the voltage divider node 58. In this way, a negative voltage level $V_{OUT}$, provided at the negative voltage output 44, is regulated. Also note that the capacitor $C_{FLY1}$ is being recharged as charge is being transferred from $C_{FLY2}$ to $C_{LOAD}$.

Figure 5:
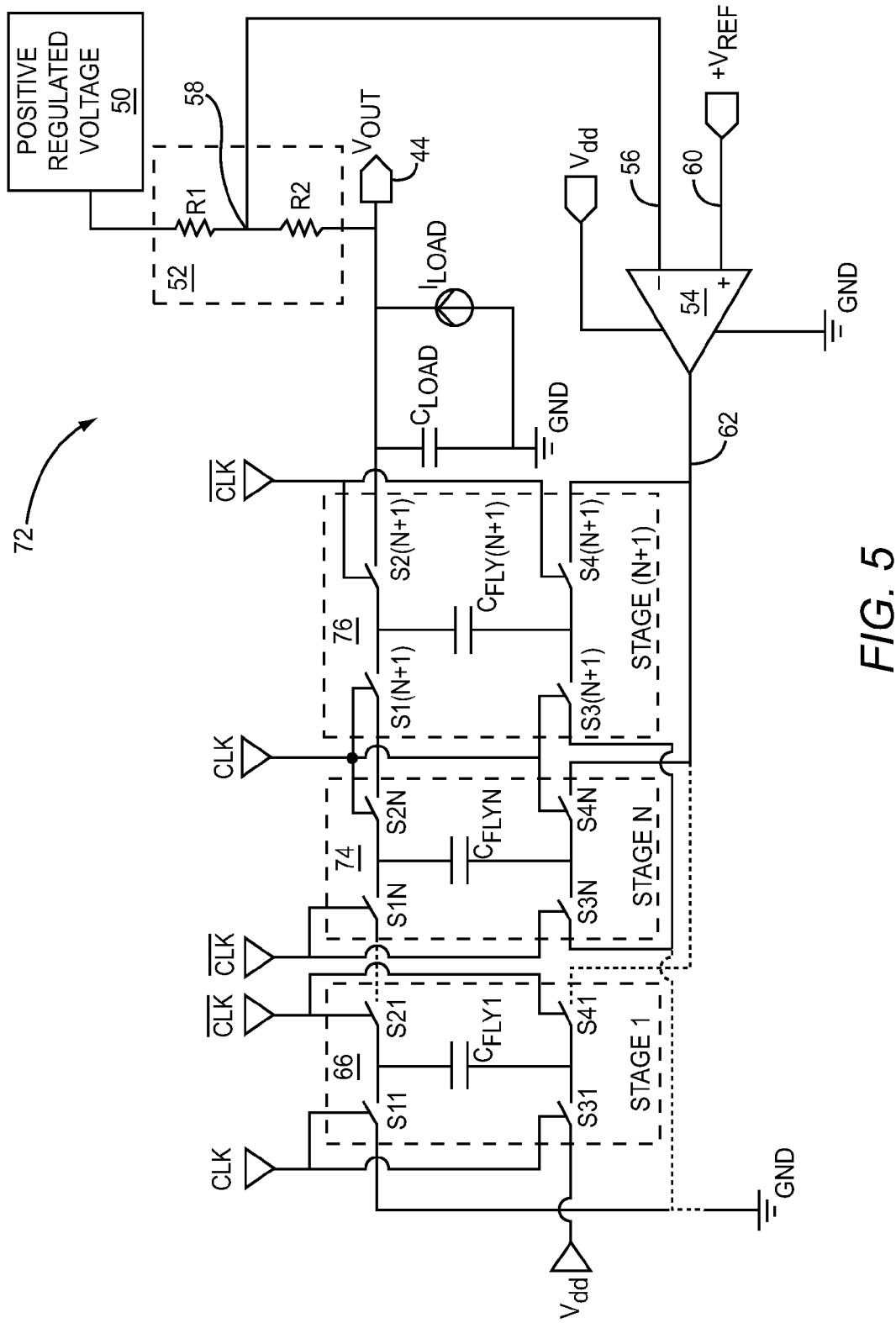
FIG. 5 depicts a regulated negative charge-pump having a plurality of stages that are driven by a feedback amplifier that is in accordance with the present disclosure.

FIG. 5 depicts a regulated negative charge-pump 72 that extends the two stage embodiment of the regulated negative charge pump 64 (FIG. 4) to include additional flying capacitor stages in accordance with the present disclosure. In this embodiment, (N+1) stages are added to the first stage 66, where (N+1) is a total number of flying capacitor stages included in the regulated negative charge-pump 72. Instead of selectively coupling the first terminal of the first flying capacitor $C_{FLY1}$ with a negative voltage source, the first terminal of the first flying capacitor $C_{FLY1}$ is selectively coupled to a fixed voltage node such as ground GND through the first first-stage electronic switch S11. Moreover, instead of selectively coupling the second terminal of the first flying capacitor $C_{FLY1}$ to ground GND, the second terminal is selectively coupled to the voltage source $V_{dd}$ through the third first-stage electronic switch S31.

A stage N 74 includes a flying capacitor $C_{FLYN}$ having a first terminal coupled to a first electronic switch S1N and a second electronic switch S2N. The flying capacitor $C_{FLYN}$ also has a second terminal coupled to a third electronic switch S3N and a fourth electronic switch S4N. The first terminal of $C_{FLYN}$ is selectively coupled to a previous stage through the first electronic switch S1N. For example, if the total number of stages (N+1) equals three, then the first electronic switch S1N will be coupled to the electronic switch S21 of the first stage 66. A second terminal of the flying capacitor $C_{FLYN}$ is selectively coupled to the output 62 of the feedback amplifier 54 through the fourth electronic switch S4N.

A stage (N+1) 76 includes a flying capacitor $C_{FLY(N+1)}$ having a first terminal coupled to a first electronic switch S1(N+1) and a second electronic switch S2(N+1). The flying capacitor $C_{FLY(N+1)}$ also has a second terminal coupled to a third electronic switch S3(N+1) and a fourth electronic switch S4(N+1). The first terminal of the flying capacitor $C_{FLY(N+1)}$ is selectively coupled to a first terminal of the flying capacitor $C_{FLYN}$ of the stage N via the first electronic switch S1(N+1) and the second electronic switch S2N that are both driven by the first clock signal CLK. The first terminal of the flying capacitor $C_{FLY(N+1)}$ is also selectively coupled to the negative voltage output 44 through the second electronic switch S2(N+1). The second terminal of the flying capacitor $C_{FLY(N+1)}$ is selectively coupled to the second terminal of the flying capacitor $C_{FLYN}$ via the third electronic switch S3(N+1) and the third switch S3N. The second terminal of the flying capacitor $C_{FLY(N+1)}$ is selectively coupled to the output 62 of the feedback amplifier 54 through the fourth electronic switch S4(N+1).

Figure 6:
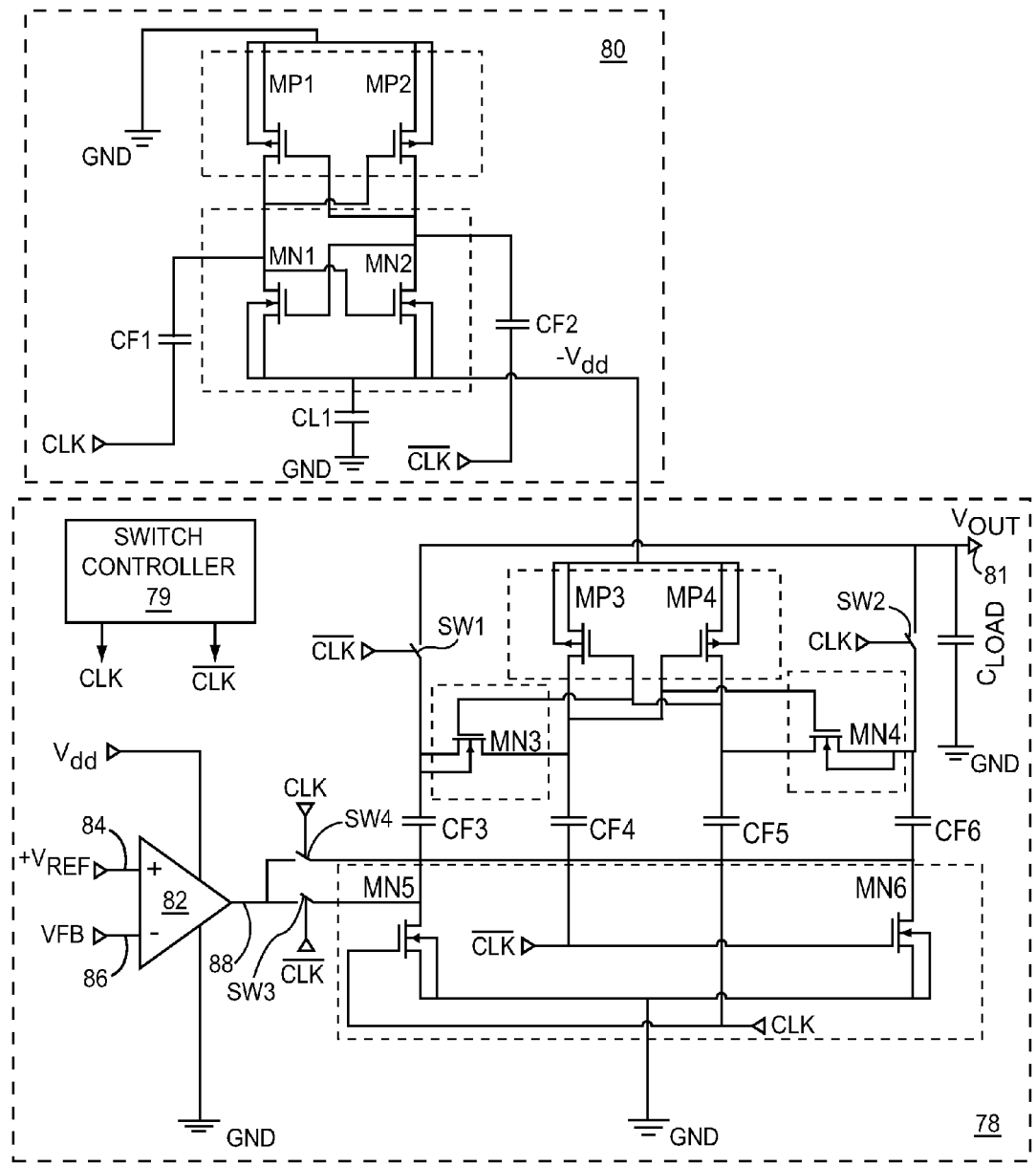
FIG. 6 depicts a detailed circuit implementation of the high efficiency regulated negative charge-pump of the present disclosure.

FIG. 6 depicts a detailed circuit implementation of a high efficiency regulated negative charge-pump 78 in accordance with the present disclosure. A cross-coupled negative charge pump circuit 80 having a first P-FET MP1, a second P-FET MP2, a first N-FET MN1 and a second N-FET MN2 along with a first flying capacitor CF1, a second flying capacitor CF2 and a first load capacitor CL1 provides the high efficiency regulated negative charge-pump 78 with an input voltage of $-V_{dd}$. A first terminal of the first flying capacitor CF1 is driven by a first clock signal CLK, and a first terminal of the second flying capacitor CF2 is driven by a second clock signal $\overline{CLK}$. The first clock signal CLK is opposite in phase to the second clock signal $\overline{CLK}$, and in this case the amplitude of the first clock signal CLK and the amplitude of the second clock signal $\overline{CLK}$ are both about equal to $V_{dd}$. A switch controller 79 has a first clock output for providing the first clock signal CLK and a second clock output for providing the second clock signal $\overline{CLK}$. Although the switch controller 79 is depicted as an element of the regulated negative charge-pump 78, the switch controller 79 could also be external of the regulated negative charge-pump 78.

The high efficiency regulated negative charge-pump 78 includes a P-FET MP3, a P-FET MP4, an N-FET MN3, an NFET MN4, an NFET MN5 and an NFET MN6. The high efficiency regulated negative charge-pump 78 also includes flying capacitors CF3, CF4, CF5 and CF6. A load capacitor $C_{LOAD}$ is coupled between a negative voltage output 81 and a fixed voltage node such as ground GND. A first terminal of the flying capacitor CF3 is selectively coupled to the negative voltage output 81 through a first electronic switch SW1 that is responsive to the second clock signal $\overline{CLK}$. A second terminal of the flying capacitor CF3 is selectively coupled to ground GND through the NFET MN5 having a gate that is responsive to the first clock signal CLK. A first terminal of the flying capacitor CF6 is selectively coupled to the negative voltage output 81 through a second electronic switch SW2 that is responsive to the first clock signal CLK. A second terminal of the flying capacitor CF6 is selectively coupled to ground GND through the NFET MN6 having a gate that is responsive to the second clock signal $\overline{CLK}$. The sources of PFET MP3 and the PFET MP4 receive the $-V_{dd}$ voltage provided by the cross-coupled negative charge pump circuit 80. The flying capacitor CF4 is coupled between a drain of the PFET MP3 and a gate of the NFET MN6, which is driven by the second clock signal $\overline{CLK}$. The flying capacitor CF5 is coupled between a drain of the PFET MP4 and a gate of the NFET MN5, which is driven by the first clock signal CLK.

The NFET MN3 has a source coupled to a first terminal of the flying capacitor CF3 that is coupled to the first electronic switch SW1. A drain of the NFET MN3 is coupled to a first terminal of the flying capacitor CF4 and to a drain of the PFET MP3. A gate of the NFET MN3 is coupled to the gate of PFET MP3, which in turn is coupled to the drain of the PFET MP4 and the drain of NFET MN4. In a symmetrical configuration, the NFET MN4 has a source coupled to a first terminal of the flying capacitor CF6 that is coupled to the second electronic switch SW2. A gate of the NFET MN4 is coupled to the gate of PFET MP4, which in turn is coupled to the drain of the PFET MP3 and the drain of the NFET MN3.

A second terminal of the capacitor CF4 is driven by the second clock signal $\overline{CLK}$, which has an amplitude that alternates between around zero volts and around $V_{dd}$. Similarly, the second terminal of the capacitor CF5 is driven by the first clock signal CLK, which has an amplitude that alternates between around $V_{dd}$ and around zero volts.

Regulation of a negative output voltage $V_{OUT}$ at the negative voltage output 81 is maintained by a feedback amplifier 82 that has a non-inverting input 84 coupled to a positive voltage reference $+V_{REF}$ and an inverting input 86 coupled to a voltage feedback signal VFB that is a sample of the negative output voltage. An output terminal 88 of the feedback amplifier 82 is selectively coupled to the second terminal of the flying capacitor CF3 through an electronic switch SW3 that is driven by the second clock signal $\overline{CLK}$. Another electronic switch SW4 that is driven by the first clock signal CLK selectively couples an output voltage provided at the output terminal 88 of the feedback amplifier 82 to the second terminal of the flying capacitor CF6.

In operation, during a first charging phase when the first clock signal CLK is around $+V_{dd}$ and the second clock signal $\overline{CLK}$ is around zero volts, the flying capacitor CF4 is charged to $-V_{dd}$. As the second clock signal $\overline{CLK}$ transitions to an amplitude of around $+V_{dd}$, the voltage across CF4 is raised to around $-2V_{dd}$. During a first output regulation phase, as the first clock signal CLK transitions to around $+V_{dd}$ and the second clock signal $\overline{CLK}$ transitions low, the electronic switch SW3 closes in response to the second clock signal $\overline{CLK}$. As a result, an output voltage provided at the output terminal 88 adjusts the voltage across the flying capacitor CF3. If the voltage level of the feedback signal VFB is less than the voltage level of the positive reference voltage $+V_{REF}$, the output voltage provided at the output terminal 88 will add charge to the flying capacitor CF3. Alternately, if the voltage level of the feedback signal VFB is greater than the voltage level of the positive reference voltage $+V_{REF}$, the output voltage provided at the output terminal 88 will subtract charge from the flying capacitor CF3.

During a second charging phase when the first clock signal CLK is around zero volts and the second clock signal $\overline{CLK}$ is around $+V_{dd}$, the flying capacitor CF6 is charged to $-V_{dd}$. As the first clock signal CLK transitions to an amplitude of around $+V_{dd}$, the voltage across CF6 is raised to around $-2V_{dd}$. During a second output regulation phase, the first clock signal CLK transitions to around zero volts and the second clock signal $\overline{CLK}$ transitions to around zero volts, the electronic switch SW4 closes in response to the first clock signal CLK.

As a result, an output voltage provided at the output terminal 88 adjusts the voltage across the flying capacitor CF6. If the voltage level of the feedback signal VFB is less than the voltage level of the positive reference voltage $+V_{REF}$, the output voltage provided at the output terminal 88 will add charge to the flying capacitor CF6. Alternately, if the voltage level of the feedback signal VFB is greater than the voltage level of the positive reference voltage $+V_{REF}$, the output voltage provided at the output terminal 88 will subtract charge from the flying capacitor CF6.

Note that the high efficiency regulated negative charge pump 78 can be converted to a high efficiency regulated positive charge pump by replacing the PMOS transistors with NMOS transistors and vice versa. The negative voltage reference $-V_{REF}$ should also be replaced by a positive voltage reference $+V_{REF}$.

The high efficiency regulated negative charge pump 78 is preferably fabricated such that the PFETs MP1, MP2, MP3 and MP4 are placed in a deep trench using an SOI process. The reason for placing the PFETs MP1, MP2, MP3 and MP4 is that well voltages can go below zero volts, and thus might forward bias a substrate diode (not shown) formed between the PFETs MP1, MP2, MP3 and MP4 and a substrate on which they are formed. Similarly, the NFETs MN1, MN2, MN3, MN4, MN5, and MN6 are preferably placed either in a deep trench or a deep n-well since the substrate on which they are formed is connected to a fixed voltage node such as ground.

Figure 7:
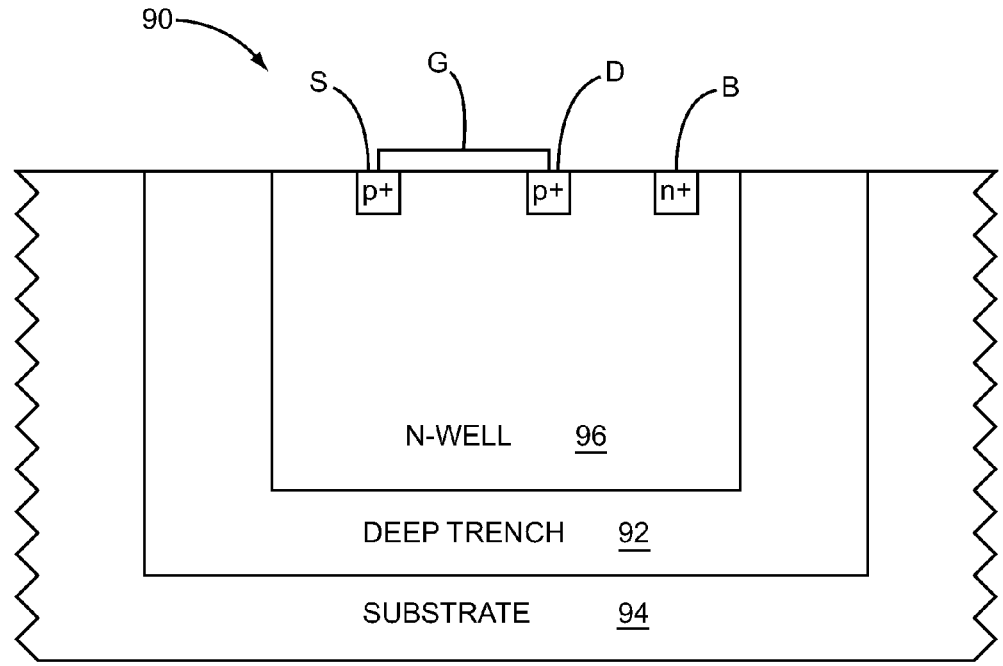
FIG. 7 depicts a deep trench negative metal oxide semiconductor (NMOS) device structure that is suitable for implementing the NMOS devices depicted in FIG. 6.

FIG. 7 depicts a deep trench negative metal oxide semiconductor (NMOS) device structure 90 that is suitable for implementing the NMOS devices depicted in FIG. 6. The NMOS device structure includes a source (S), a gate (G), and a drain (D). A bulk or body (B) connection is also included that can be connected to a fixed voltage node to control a body effect, which if left uncontrolled may result in degradations of many specified parameters of the NMOS device structure 90. In particular, a deep trench 92 is highly oxidized to provide insulation between a substrate 94 and an N-Well 96. In contrast to the deep trench 92, the substrate 94 is highly conductive and is preferably connected to a fixed voltage node such as ground GND.

Figure 8:
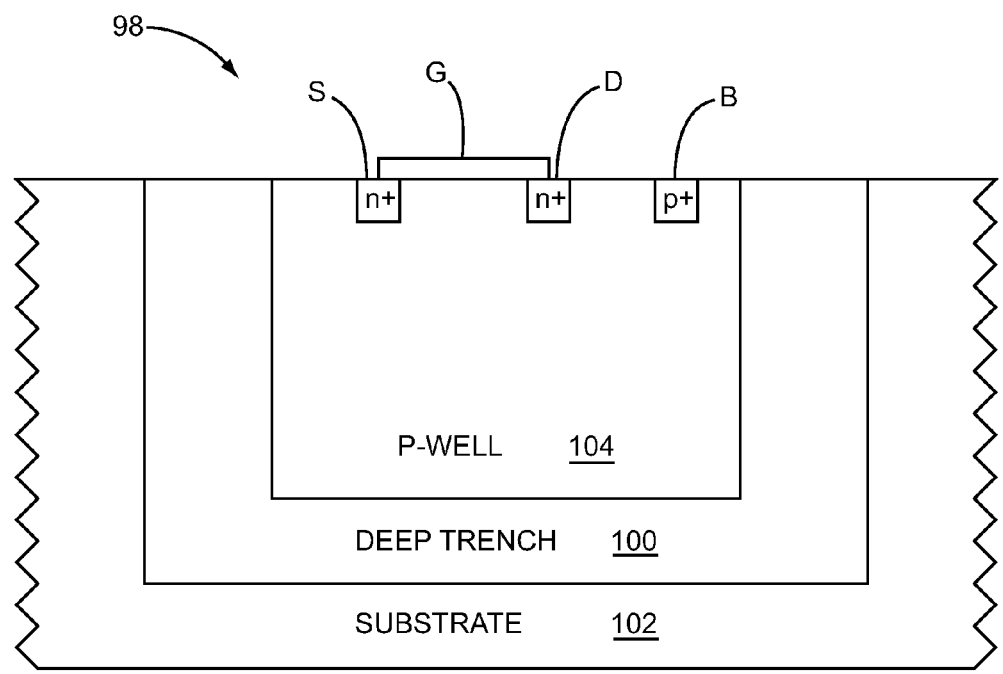
FIG. 8 depicts a deep trench positive metal oxide semiconductor (PMOS) device structure that is suitable for implementing the PMOS devices depicted in FIG. 6.

FIG. 8 depicts a deep trench positive metal oxide semiconductor (PMOS) device structure 98 that is suitable for implementing the PMOS devices depicted in FIG. 6. The PMOS device structure 98 includes a source (S), a gate (G), and a drain (D). A bulk or body (B) connection is also included that can be connected to a fixed voltage node to control the body effect, which if left uncontrolled may result in degradations of many specified parameters of the PMOS device structure 98. The PMOS device structure 98 is contained within a deep trench 100 that is highly oxidized to provide insulation between a general substrate 102 and a P-Well 104 that serves as a substrate for the PMOS device structure 98. In contrast, the substrate 102 is highly conductive and is connected to a fixed voltage node such as ground GND.

Figure 9:
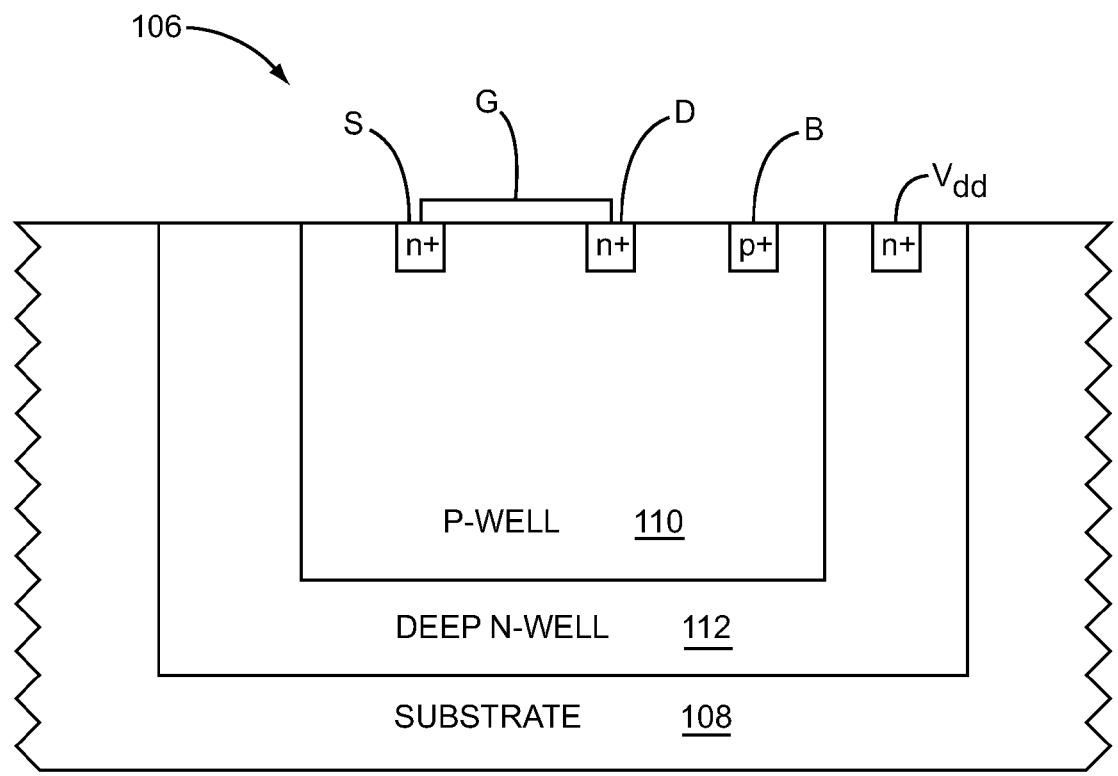
FIG. 9 depicts a deep N-Well NMOS structure that is suitable for implementing the NMOS devices depicted in FIG. 6.

FIG. 9 depicts a deep N-Well NMOS device structure 106 that is suitable for implementing the NMOS devices depicted in FIG. 6. The deep N-Well NMOS device structure 106 provides isolation from a substrate 108 and hence substrate noise while also allowing a voltage other than $V_{dd}$ and ground by placing a source (S), a gate (G) and a drain (D) of the deep N-Well NMOS device structure 106 within a P-Well 110. A deep N-Well section 112 is typically connected to the highest voltage available, which is usually $V_{dd}$. A bulk or body (B) connection is also included that can be connected to a fixed voltage node to control a body effect, which if left uncontrolled may result in degradations of many specified parameters of the deep N-Well NMOS device structure 106.

Figure 10:
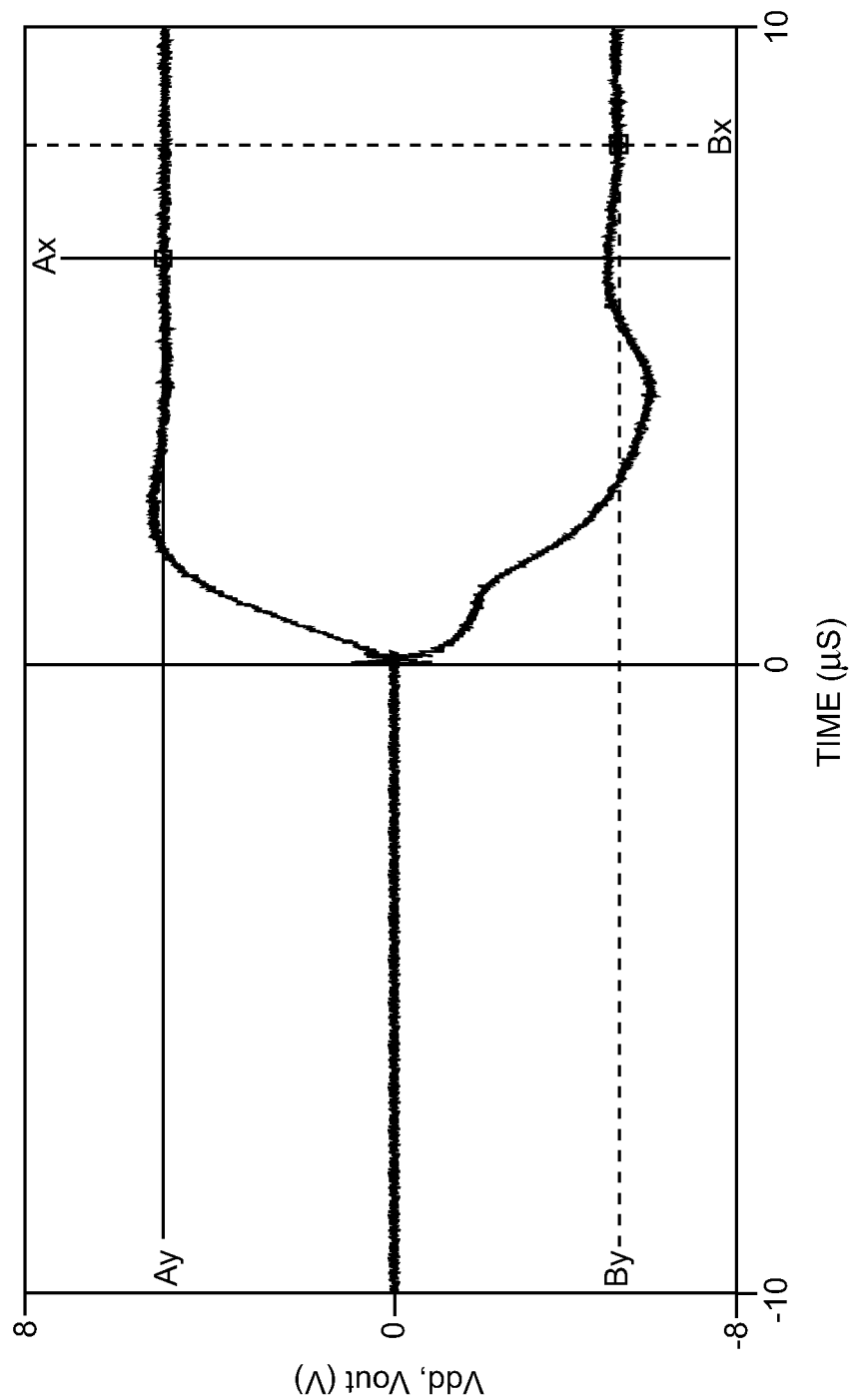
FIG. 10 is a graph depicting output voltage measurements for a realized circuit based upon the circuit depicted in FIG. 6.

FIG. 10 is a graph depicting output voltage measurements for a realized circuit based upon the high efficiency regulated negative charge-pump 78 depicted in FIG. 6. A positive output voltage curve that includes the point (Ay, Ax) shows that a positive regulated voltage $V_{dd}$ reaches a steady state voltage of 5.3V in around 6 μS after the high efficiency regulated negative charge-pump 78 is activated. A negative output voltage curve that includes a point (Bx, By) for the output voltage $V_{OUT}$ reaches a steady state voltage of −5.2V in around 8 μS after the high efficiency regulated negative charge-pump 78 is activated.

Figure 11:
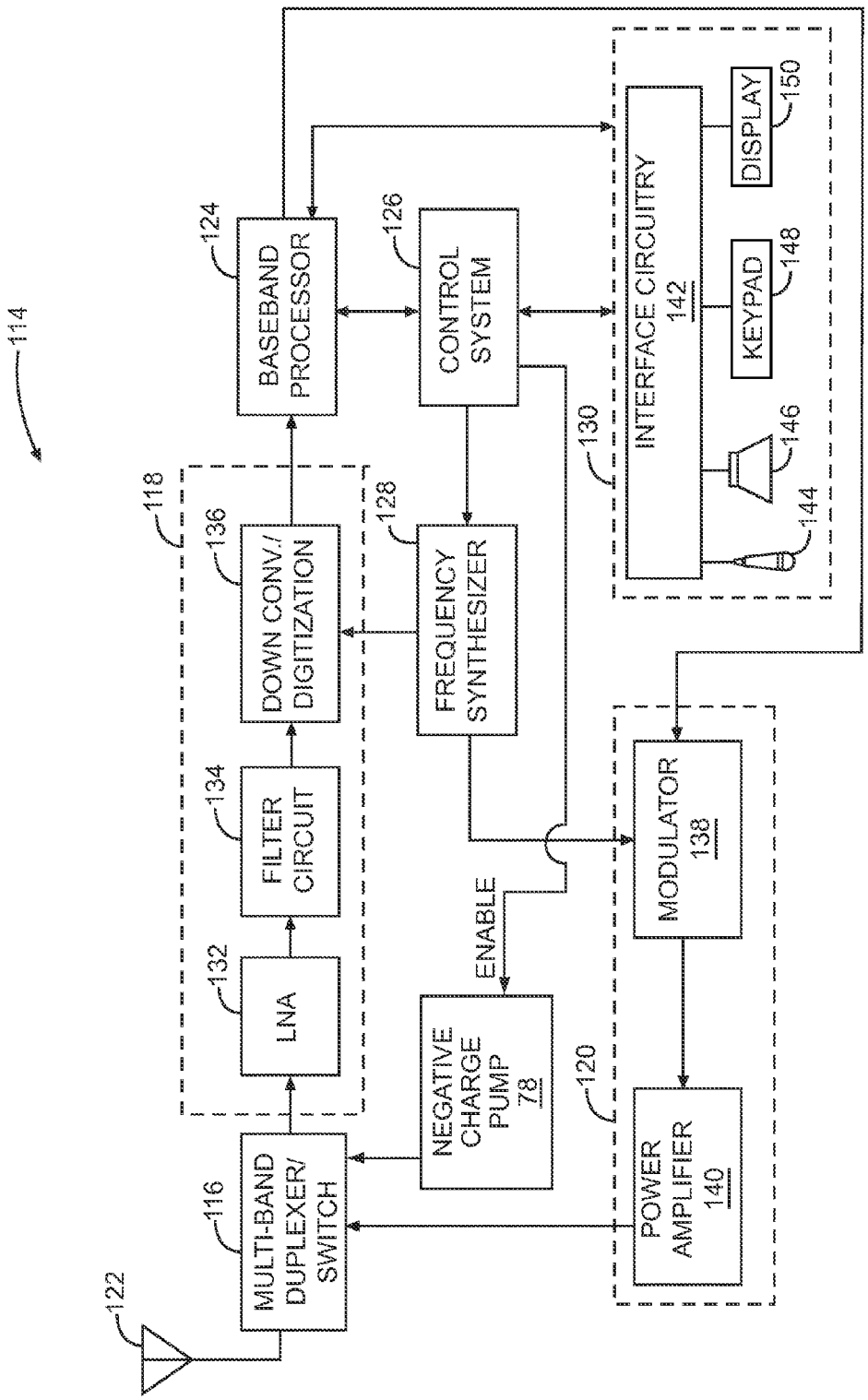
FIG. 11 depicts user equipment (UE) in the form of a mobile terminal that incorporates a preferred embodiment of the circuit of FIG. 6.

FIG. 11 depicts the basic architecture of user equipment (UE) in the form of a mobile terminal 114 that incorporates an embodiment of the high efficiency regulated negative charge-pump 78 (FIG. 6). In particular, the high efficiency regulated negative charge-pump 78 is usable to activate a multi-band duplexer or radio frequency (RF) switch 116 in the mobile terminal 114. The mobile terminal 114 may include a receiver front end 118, a radio frequency (RF) transmitter section 120, an antenna 122, a baseband processor 124, a control system 126, a frequency synthesizer 128, and an interface 130. The receiver front end 118 receives information bearing radio frequency signals from one or more remote transmitters provided by a base station (not shown). A low noise amplifier (LNA) 132 amplifies the signal. A filter circuit 134 minimizes broadband interference in the received signal, while down conversion and digitization circuitry 136 down converts the filtered, received signal to an intermediate or baseband frequency signal, which is then digitized into one or more digital streams. The receiver front end 118 typically uses one or more mixing frequencies generated by the frequency synthesizer 128. The baseband processor 124 processes the digitized received signal to extract the information or data bits conveyed in the received signal. This processing typically comprises demodulation, decoding, and error correction operations. As such, the baseband processor 124 is generally implemented in one or more digital signal processors (DSPs).

On the transmit side, the baseband processor 124 receives digitized data, which may represent voice, data, or control information, from the control system 126, which it encodes for transmission. The encoded data is output to the RF transmitter section 120, where it is used by a modulator 138 to modulate a carrier signal that is at a desired transmit frequency. A power amplifier circuitry 140 amplifies the modulated carrier signal to a level appropriate for transmission, and delivers the amplified and modulated carrier signal to the antenna 122 through the duplexer or RF switch 116. The control system 126 controls an ENABLE signal that activates and deactivates the high efficiency regulated negative charge-pump 78 as needed. For example, the control system 126 may activate the high efficiency regulated negative charge-pump 78 in anticipation of closing a MEMS switch (not shown) or other device for a transmission event. Alternately, the control system 126 may deactivate the high efficiency regulated negative charge-pump 78 to conserve energy.

A user may interact with the mobile terminal 114 via the interface 130, which may include interface circuitry 142 associated with a microphone 144, a speaker 146, a keypad 148, and a display 150. The interface circuitry 142 typically includes analog-to-digital converters, digital-to-analog converters, amplifiers, and the like. Additionally, it may include a voice encoder/decoder, in which case it may communicate directly with the baseband processor 124. The microphone 144 will typically convert audio input, such as the user's voice, into an electrical signal, which is then digitized and passed directly or indirectly to the baseband processor 124. Audio information encoded in the received signal is recovered by the baseband processor 124, and converted by the interface circuitry 142 into an analog signal suitable for driving the speaker 146. The keypad 148 and the display 150 enable the user to interact with the mobile terminal 114, input numbers to be dialed, address book information, or the like, as well as monitor call progress information.

Those skilled in the art will recognize improvements and modifications to the preferred embodiments of the present disclosure. All such improvements and modifications are considered within the scope of the concepts disclosed herein and the claims that follow.

What is claimed is:

1. A charge-pump circuit comprising:
   at least one flying capacitor stage with a capacitor having a first terminal that is selectively coupled between one of a negative voltage input through a first electronic switch and a negative voltage output through a second electronic switch, the capacitor having a second terminal that is selectively coupled between one of a fixed voltage node through a third electronic switch and an error signal input through a fourth electronic switch;

a positive voltage source communicably coupled to the negative voltage output through a feedback network having a feedback output;

a feedback amplifier having an error signal output coupled to the error signal input, a reference voltage input, and a feedback input coupled to the feedback output of the feedback network; and a switch controller having a first clock output for driving the first electronic switch and the third electronic switch, and a second clock output for driving the second electronic switch and the fourth electronic switch.

2. The charge-pump circuit of claim 1, wherein a first clock signal that is output from the first clock output is substantially inverse in phase to a second clock signal that is output from the second clock output.

3. The charge-pump circuit of claim 2, wherein the first clock signal and the second clock signal are substantially non-overlapping.

4. The charge-pump circuit of claim 1, wherein the fixed voltage node is ground.

5. The charge-pump circuit of claim 1, wherein the feedback amplifier is powered by the positive voltage source.

6. The charge-pump circuit of claim 1, wherein the feedback network is a first resistor and a second resistor coupled in a voltage divider configuration.

7. The charge-pump circuit of claim 6, wherein the feedback output is coupled to and between the first resistor and the second resistor.

8. The charge-pump circuit of claim 1, wherein the reference voltage input is adapted to receive a positive band gap voltage reference.

9. The charge-pump circuit of claim 1, wherein the charge-pump circuit is implemented via a Silicon-on-insulator (SOI) process.

10. The charge-pump circuit of claim 1, wherein the charge-pump circuit is implemented via a Deep negative-well (N-Well) complementary metal oxide semiconductor (CMOS) process.

11. A mobile terminal comprising:

an antenna;

a radio frequency (RF) switch coupled to the antenna;

a charge-pump circuit for activating the RF switch, the charge pump circuit comprising:

at least one flying capacitor stage with a capacitor having a first terminal that is selectively coupled between one of a negative voltage input through a first electronic switch and a negative voltage output through a second electronic switch, the capacitor having a second terminal that is selectively coupled between one of a fixed voltage node through a third electronic switch and an error signal input through a fourth electronic switch;

a positive voltage source communicably coupled to the negative voltage output through a feedback network having a feedback output;

a feedback amplifier having an error signal output coupled to the error signal input, a reference voltage input, and a feedback input coupled to the feedback output of the feedback network; and a switch controller having a first clock output for driving the first electronic switch and the third electronic switch, and a second clock output for driving the second electronic switch and the fourth electronic switch; and a control system for enabling and disabling the charge-pump circuit.

12. The mobile terminal of claim 11, wherein a first clock signal that is output from the first clock output is substantially inverse in phase to a second clock signal that is output from the second clock output.

13. The mobile terminal of claim 12, wherein the first clock signal and the second clock signal are substantially non-overlapping.

14. The mobile terminal of claim 11, wherein the fixed voltage node is ground.

15. The mobile terminal of claim 11, wherein the feedback amplifier is powered by the positive voltage source.

16. The mobile terminal of claim 11, wherein the feedback network is a first resistor and a second resistor coupled in a voltage divider configuration.

17. The mobile terminal of claim 16, wherein the feedback output is coupled to and between the first resistor and the second resistor.

18. The mobile terminal of claim 11, wherein the reference voltage input is adapted to receive a positive band gap voltage reference.

19. The mobile terminal of claim 11, wherein the charge-pump circuit is implemented via a Silicon-on-insulator (SOI) process.

20. The mobile terminal of claim 11, wherein the charge-pump circuit is implemented via a Deep negative-well (N-Well) complementary metal oxide semiconductor (CMOS) process.

* * * * *